US008659238B2

(12) United States Patent
Chen

(10) Patent No.: US 8,659,238 B2
(45) Date of Patent: Feb. 25, 2014

(54) SWITCHING POWER SUPPLY WITH POWER FEEDBACK TO KEEP LAMP'S BRIGHTNESS CONSTANT

(75) Inventor: Liang Chen, Lake Oswego, OR (US)

(73) Assignees: Xi' An Upright Photoelectric Technology Co., Ltd, High Tech Zone, Xi'An, Shaanxi (CN); Upright Lighting LLC, Allen, TX (US)

( * ) Notice: Subject to any disclaimer, the term of this patent is extended or adjusted under 35 U.S.C. 154(b) by 240 days.

(21) Appl. No.: 13/066,626

(22) Filed: Apr. 20, 2011

(65) Prior Publication Data

US 2012/0268039 A1    Oct. 25, 2012

(51) Int. Cl.
*H05B 41/282* (2006.01)
*H02M 7/757* (2006.01)
*H02M 3/335* (2006.01)

(52) U.S. Cl.
USPC .......................................... 315/307; 315/219

(58) Field of Classification Search
USPC ......... 315/307, 297, 299, 219, 223, 244, 274, 315/283, 308
See application file for complete search history.

(56) References Cited

U.S. PATENT DOCUMENTS

| 7,781,982 | B2* | 8/2010 | Tatsumi | 315/291 |
|---|---|---|---|---|
| 2009/0015173 | A1* | 1/2009 | Foo | 315/247 |
| 2011/0169426 | A1* | 7/2011 | Sadwick et al. | 315/307 |
| 2011/0309759 | A1* | 12/2011 | Shteynberg et al. | 315/201 |

* cited by examiner

*Primary Examiner* — Daniel D Chang

(57) ABSTRACT

A power supply and methods are provided. In one implementation, the power supply includes a switching converter with power feedback circuit to output constant power to keep lamp at constant brightness. The power feedback circuits include a current feedback circuit and a voltage feedback circuit. The power supply further includes a controller operable to adjust on time or duty cycle of main switch to keep the output power constant.

5 Claims, 7 Drawing Sheets

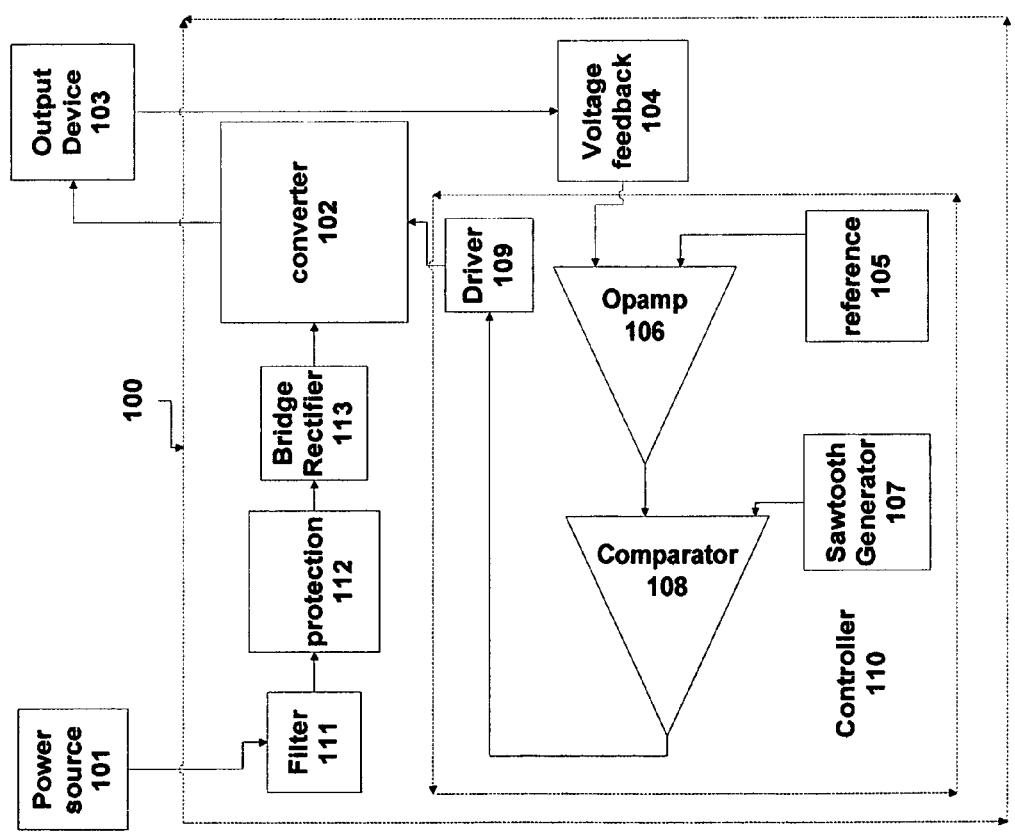
FIG._1 (PRIOR ART)

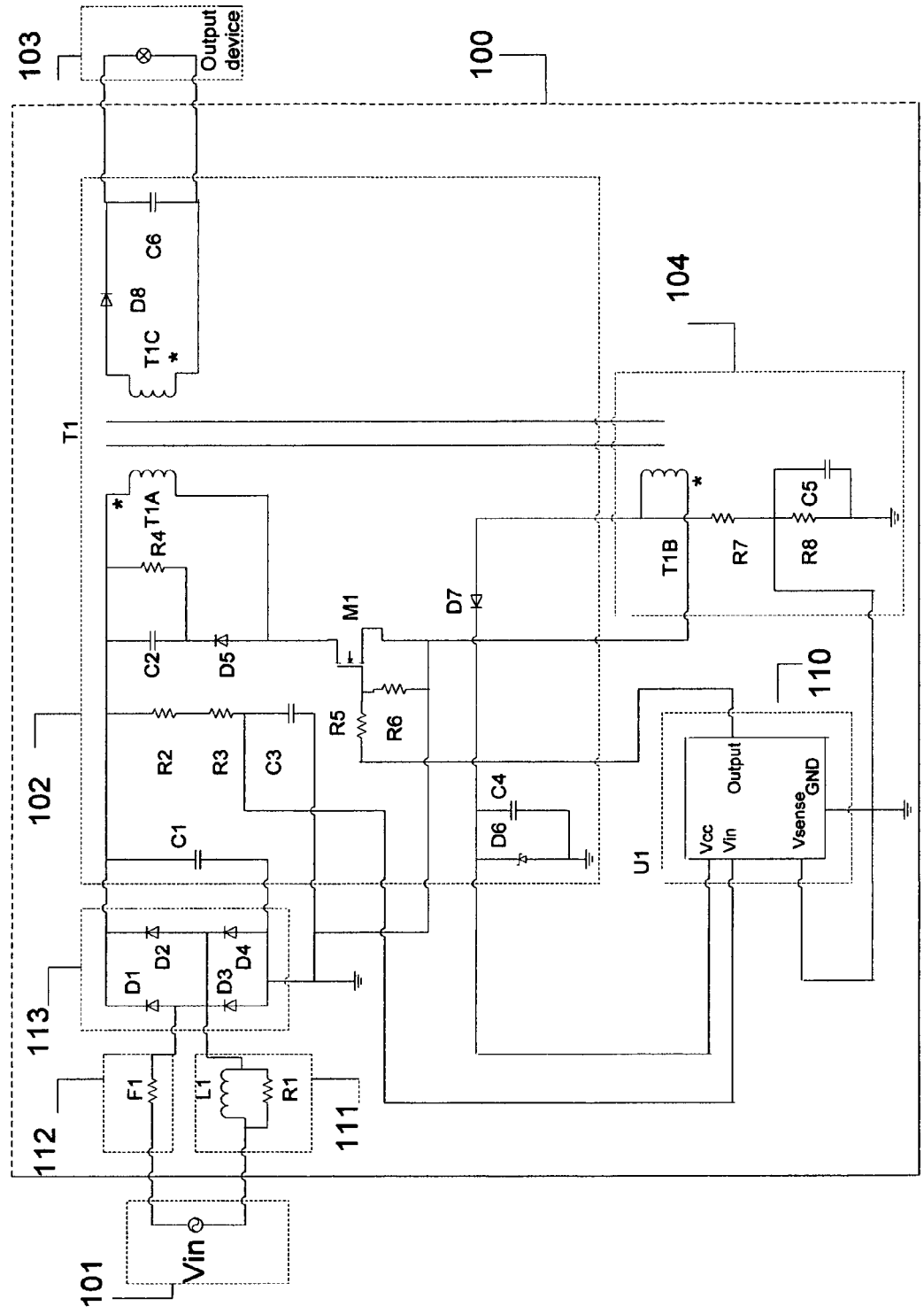
FIG._2 (PRIOR ART)

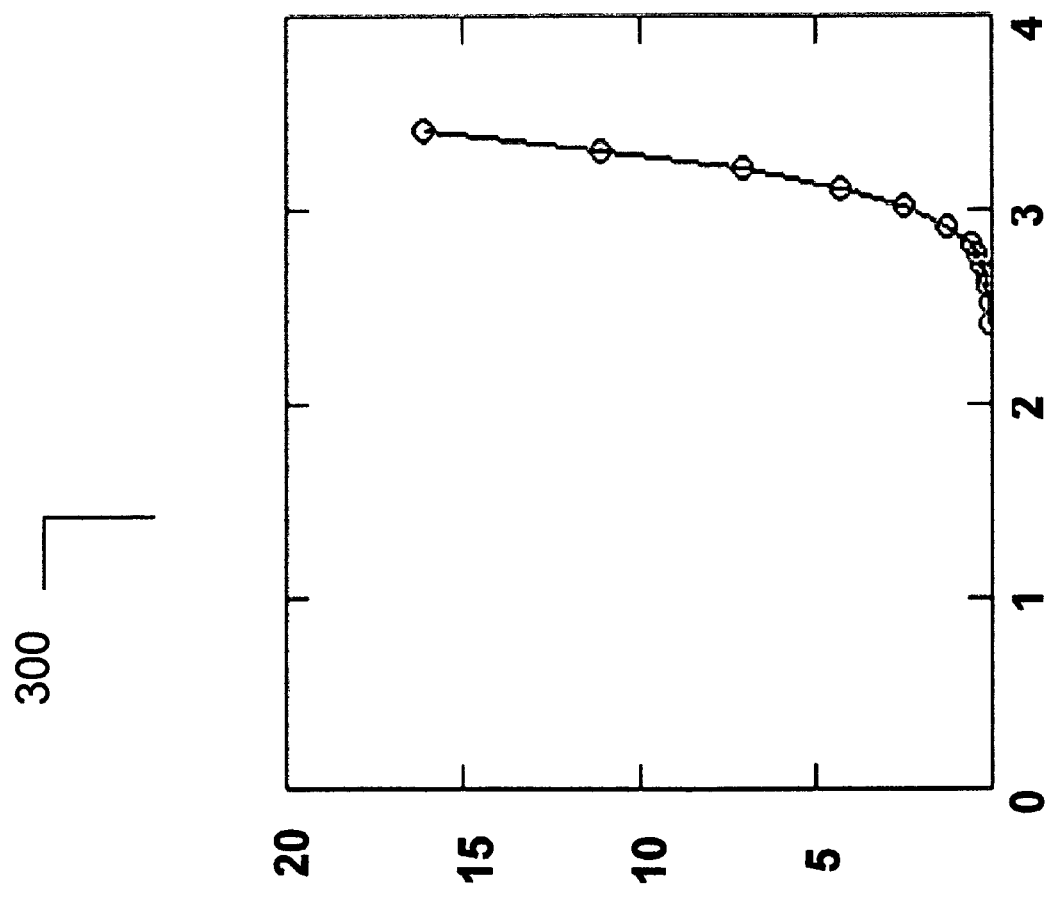
FIG._3

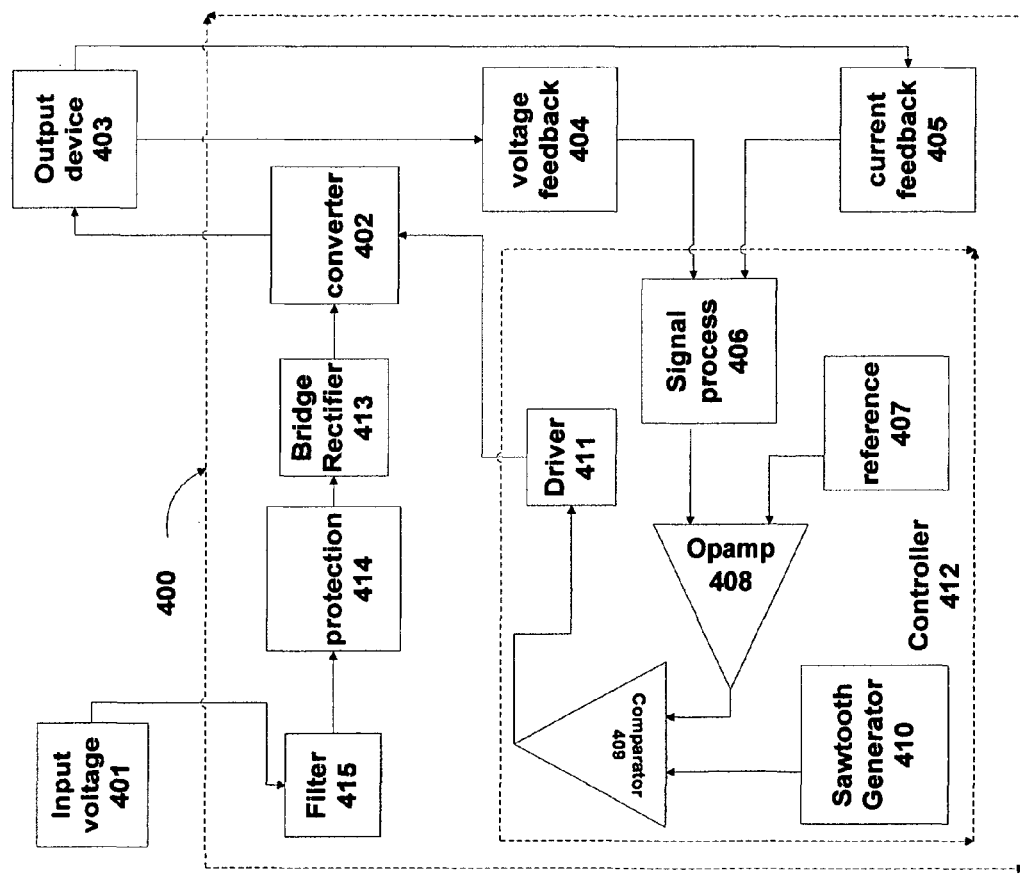
FIG._4

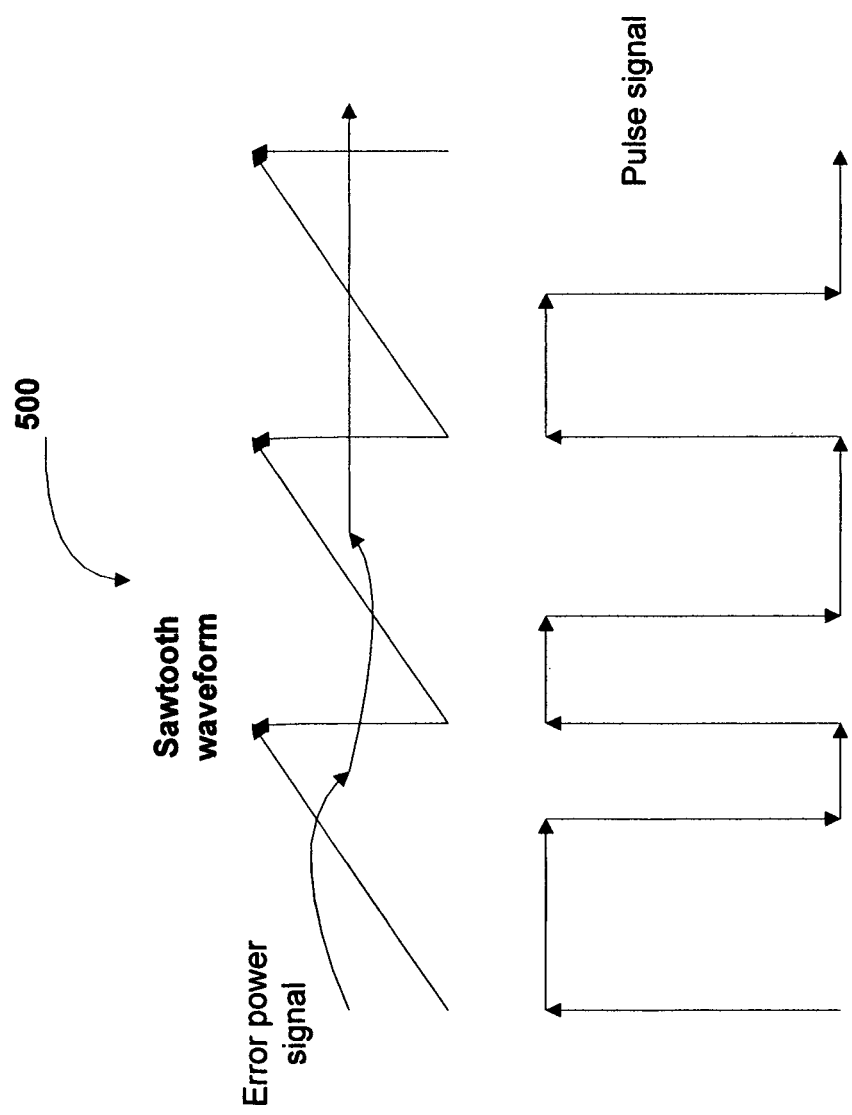
FIG._5

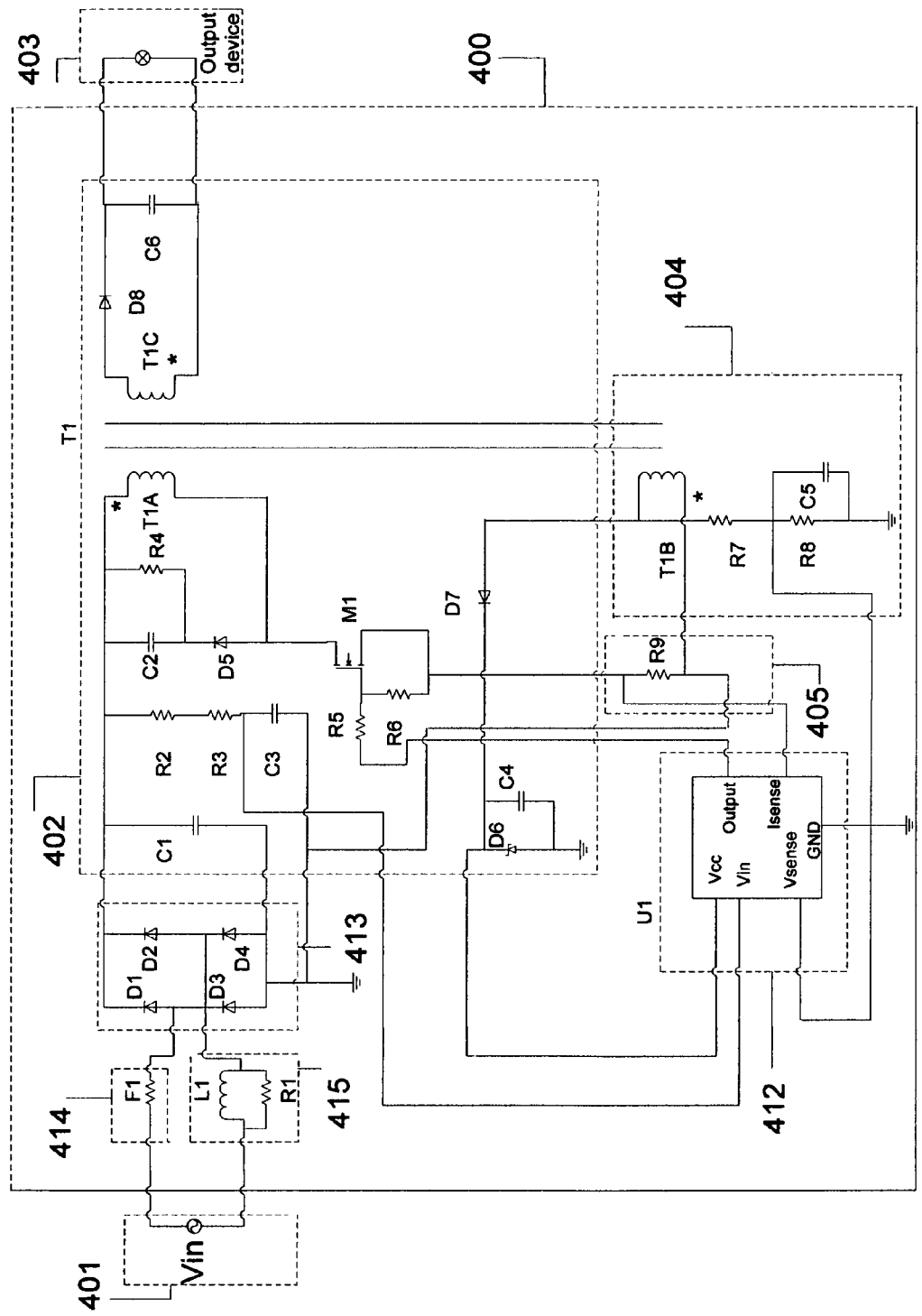
FIG._6

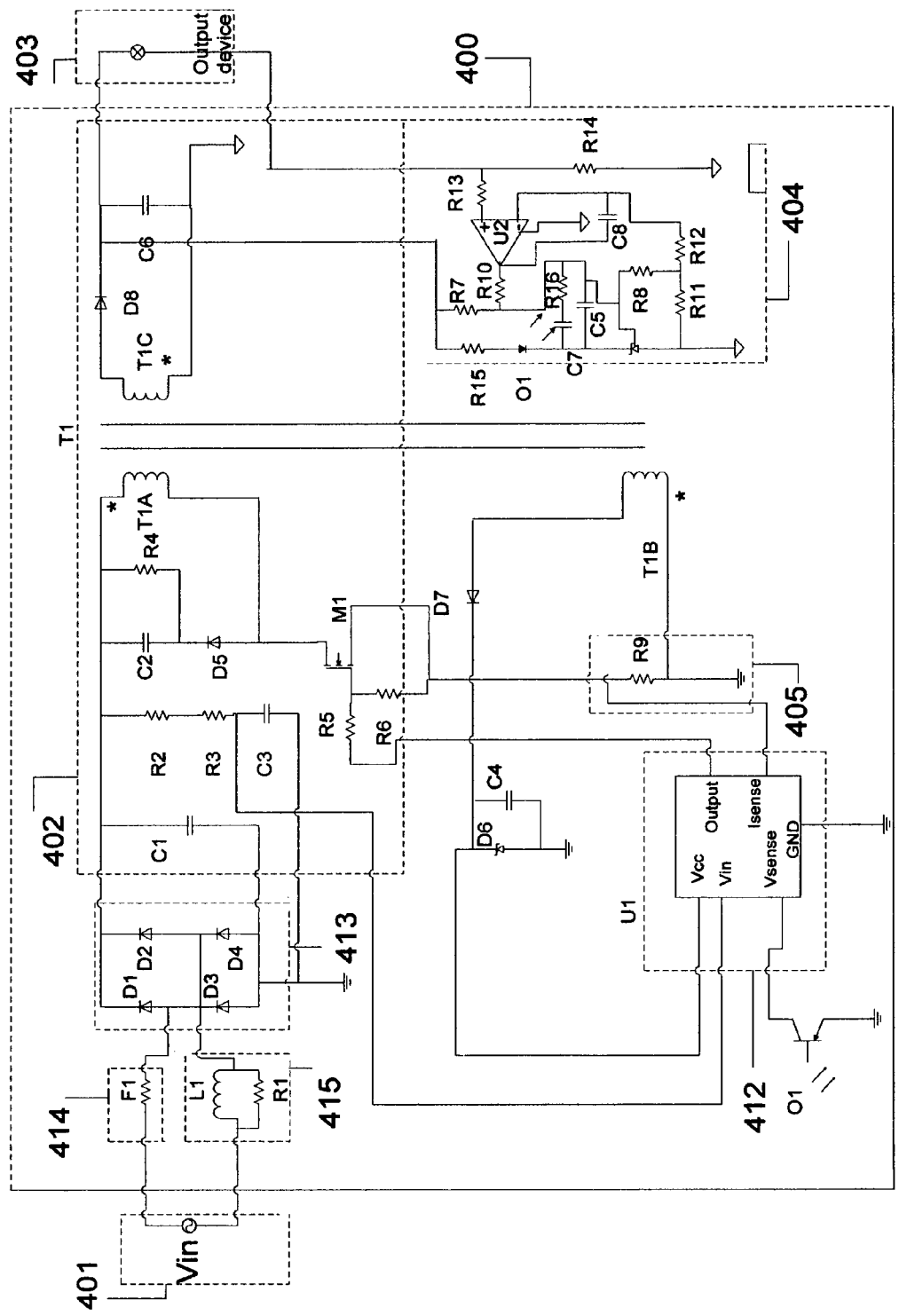
FIG._7

SWITCHING POWER SUPPLY WITH POWER FEEDBACK TO KEEP LAMP'S BRIGHTNESS CONSTANT

BACKGROUND

The following disclosure relates to switching power supply electrical circuit and signal process.

Switching power supply is used to power many types of electronic devices, for example, lamps. A conventional power supply typically includes a converter. A converter is a power supply switching circuit to convert AC or DC input voltage to a DC output voltage at predetermined value with feedback.

FIG. 1 shows a conventional switching power supply 100 block diagram. In one implementation, Power source 101 is an AC (alternating current) voltage source. Filter 111 prevent high frequency current from entering power source 101. Protection 112 cut off connection between filter and the following circuit at over current condition. Bridge rectifier 113 converts AC sinusoidal waveform to DC waveform. Converter 102 receives a rectified DC voltage from the bridge rectifier 113 and converts to a DC voltage to an output device 103. Converter 102 is a switching power supply electrical circuit. The voltage feedback 104 samples the voltage signal of output device 103 and feeds the signal proportional to lamp voltage back to controller 110 and compare with reference 105 through Opamp 106. Reference 105 is an electrical circuit that supplies very accurate DC voltage. The comparing error signal on output of Opamp 106 will be sent to Comparator 108 and will be compared with Sawtooth Generator 107. The pulse output of Comparator 108 will be sent to Driver 109. The output of Driver 109 will control on time or frequency of main switch of converter 102 to keep output voltage constant at predetermined value set by reference 105.

FIG. 2 shows one implementation of a conventional switching power supply 100.
Power source 101 is an AC (alternative current) voltage source.
In an implementation in which filter 111 includes an Inductor L1 and a resistor R1.
In an implementation in which protection 112 includes a Fuse F1.
Bridge rectifier 113 includes diodes D1, D2, D3 and D4 that rectify AC voltage from Vin to a DC voltage across capacitor C1.
A converter 102 includes a flyback converter circuit, input sense, filter, biasing circuit and snubber circuit. The flyback converter circuit includes a flyback topology converter that receives a DC (direct current) voltage from bridge rectifier 113. Transformer T1, Mosfet M1, diode D8 and capacitor C6 constitute a flyback topology that converts a rectified AC or DC voltage to a constant output DC voltage at predetermined value. Resistors R2, R3 and capacitor C3 compose an input sense circuit. Capacitor C5 is a filter for feedback signal sent to Vsense pin of IC controller. Auxiliary winding T1B, diode D7, zenor diode D6 and capacitor C4 constitute a biasing circuit for IC controller. Capacitor C2, diode D5 and resistor R4 become a snubber circuit to clamp voltage across drain-source of Mosfet M1.
Output device 103 is a lamp.
Voltage feedback circuit 104 includes an auxiliary winding T1B and resistors R7, R8.
Controller 110 is an IC controller that has pins as Vcc, Vin, Vsense, GND and output. The IC controller has comparator 108, Sawtooth Generator 107, Opamp 106, reference 105 and driver 109 integrated inside the controller In one implementation, for example, the lamp is a LED lamplight emitting diode). The current is approximately an exponential function of voltage.
$I=I_S(e^{V_D/(nV_T)}-1)$; Where, I is the diode current, $I_S$ is the reverse bias saturation current, $V_D$ is the voltage across the diode, $V_T$ is the thermal voltage, n is the ideality factor, and the ideality factor n varies from 1 to 2.

FIG. 3 shows the current with respect of voltage of LED lamp. When voltage has a very little change, current will have a huge change.

Because there are long wires between output of converter and lamp, there is a voltage drop between converter output and lamp. Some factors affect voltage variation. Those are reference tolerance, output voltage sampling, feedback tolerance and voltage drop tolerance across converter output and lamp. Total tolerance will cause voltage variation on lamp. For LED lamp, current will have a huge change when voltage has a very little change, Brightness is proportional to power of LED lamp. Power P=V*I, So conventional switching power supply will cause huge brightness variation for LED lamp. That will cause LED lamp flickering that brings fatigue or hurt to eyes for the long term.

SUMMARY

In general, in one aspect, this specification describes a switching power supply with power feedback that keeps lamp's brightness constant. There are two feedback loops: one is voltage feedback loop that is an electrical circuit sampling output voltage across lamp and sends signal proportional to output voltage to controller; the other is current feedback loop that is an electrical circuit sampling output current through lamp and sends signal proportional to output current to controller. In the controller, voltage feedback signal and current feedback signal are sent to signal processing circuit. The signal processing circuit derives a power feedback signal that is multiplication product of voltage feedback signal and current feedback signal. The power feedback signal is proportional to output power and then is compared to reference circuit that predetermines output power value. Then the error signal between output power feedback signal and reference is used to create a pulse. And the pulse is sent to driver to change on time of main switch to keep output power constant at predetermined value. The output power of lamp is constant and so the lamp has constant brightness without flickering.

Particular implementations can include one or more of the following features. The power supply can include a filter to prevent high frequency current from entering input voltage. The power supply can include a protection that cut off connection between input voltage and the power supply in case short circuit or over current happens. The power supply can further include a bridge rectifier operable to rectify an alternating current (AC) voltage and produce DC input voltage The bridge rectifier can include four diodes connected in a bridge configuration. The converter can be a flyback converter that converts input voltage to a DC voltage output for output device with predetermined output power. The controller can adjust the on time of main switch in the converter. The voltage feedback circuit can send feedback signal from secondary to primary by auxiliary transformer winding or optocoupler. The current feedback circuit can use current sense resistor or signal transformer to sample current feedback signal.

In general, in another aspect, the specification describes a method that includes: sampling both current and voltage and feeding back both signals to controller; generating a power feedback signal by multiplying current feedback signal and voltage feedback signal; comparing feedback signal to reference with Opamp and sending error signal to comparator; comparing error signal with sawtooth generator and generating a signal pulse to driver; sending a power pulse to main switch of converter to control on time by driver; and controlling on time of main switch to output constant power to output device.

DESCRIPTION OF DRAWINGS

FIG. 1 is a block diagram of traditional switching power supply with voltage feedback.

FIG. 2 is a schematic diagram of a conventional switching power supply with voltage feedback.

FIG. 3 is a typical current-voltage curve for an LED.

FIG. 4 is a block diagram of switching power supply with power feedback to keep lamp's brightness constant.

FIG. 5 is a diagram showing the relation between pulse signal, error power signal and sawtooth waveform.

FIG. 6 is a schematic diagram of switching power supply with power feedback in which voltage feedback is primary feedback to keep lamp's brightness constant.

FIG. 7 is a schematic diagram of switching power supply with power feedback in which voltage feedback is opto-coupler feedback to keep lamp's brightness constant.

DETAIL DESCRIPTION

FIG. 4 is a block diagram of switching power supply 400 with power feedback to output constant power to output device 403. In one implementation, output device 403 is a lamp. Power supply 400 receives an AC (alternating current) from an input voltage 401. Filter 415 prevents high frequency current entering input voltage 401 or power system. Protection 414 protects power supply at over current condition by cutting off power supply from input voltage 401. Bridge rectifier 413 converts the AC (alternating current) to a DC input voltage. Converter 402 converts the DC input voltage to a DC output voltage and output a constant power to output device 403 at predetermined power value set by reference 407. Voltage feedback 404 samples the voltage of lamp 403 and feeds the signal proportional to lamp voltage back to signal process 406 inside the controller. Current feedback 405 samples the current of lamp 403 and feeds the signal proportional to lamp current back to signal process 406 inside the controller. Signal process 406 receive signals from current feedback 405 and from voltage feedback 404, then generates a multiplication product signal and sends to opamp 408. Opamp 408 compares the signal from signal process 406 to reference 407, then the error power signal with gain is sent to comparator 409. Comparator 409 compares the error power signal from opamp 408 to sawtooth waveform received from sawtooth generator 410, then generates a signal pulse to driver 411. Driver 411 receives a signal pulse from comparator 409 and output a power pulse to control main switch of power converter 402. The main switch of power converter is controlled to keep output constant power at predetermined value so that the lamp keeps constant brightness.

Converter 402 can be one of the forms of a boost converter, a buck-boost converter or a flyback converter.

FIG. 5 shows the process for controller generating a pulse based on error power signal, and sawtooth wavefrom. FIG. 5 shows the sawtooth wavefrom received from sawtooth generator 410, the error power signal received from opamp 408 and pulse signal generated by comparator 409.

Now we compare conventional voltage feedback and power feedback.

Conventional voltage feedback signal is:

$$\text{Voltage error} = (V + \text{delta}(V)) - V \quad \text{(eq. 1)}$$

Where V is a predetermined voltage value, delta(V) is the ripple plus all error signal. Delta(V) is caused by voltage feedback circuit sampling circuit tolerance, resistor tolerance, Opamp offset, comparator offset, minimum controllable pulse width and Mosfet character. So there is always a delta(V) existent. If LED voltage has a little change, LED current will have a huge variation that causes brightness variation. So conventional voltage feedback cannot keep LED lamp at constant brightness and LED lamp is flickering.

The power error signal is given by the following equation:

$$\begin{aligned}\text{Power error} &= (V + \text{delta}(V))*(I + \text{delta}(I)) - V*I \quad \text{(eq. 2)}\\ &= V*\text{delta}(I) + I*\text{delta}(V) +\\ &\quad \text{delta}(V)*\text{delta}(I)\end{aligned}$$

Delta(V)*delta(I) is a trivial item and can be disregarded, so
$$\text{power error} = V*\text{delta}(I) + I*\text{delta}(V)$$

Voltage across one LED is between 3~4 v, current in LED lamp is usually around 100 mA~400 mA. Usually LED is in series and even in array. So V is even between 20~40 v. For an example, power error=40*delta(I)+0.4*delta(V). From the application point, current error through LED is amplified 40 times, but voltage error across LED is decreased to 40%. So the power feedback cause current dominate in feedback. That is reasonable to control LED current in first priority and control LED voltage at second priority. If LED voltage has a little change, LED current will have a huge variation that causes brightness variation. So power feedback control current in first priority to keep LED lamp at constant current firstly and at constant voltage secondly. Power feedback can control lamp at constant brightness.

FIG. 6 illustrates one implementation of switching power supply 400 in which voltage feedback is primary feedback. Input voltage 401 is an AC (alternative current) voltage source. Output device 403 is a lamp. Filter 415 includes an inductor L1 and a resistor R1 that constitute an EMI filter. Protection 414 includes a Fuse F1 that is an over current protection circuit. Bridge rectifier 413 includes diodes D1, D2, D3 and D4 that constitute a bridge rectifier to rectify AC voltage from input voltage 401 to a DC voltage across capacitor C1. Converter 402 includes a flyback converter circuit, input sense, biasing circuit and snubber circuit. Voltage feedback circuit 404 includes an auxiliary winding T1B and resistors R7, R8. Current feedback circuit 405 includes a resistor R9. Controller 412 is an IC controller that has pins as Vcc, Vin, Vsense, Isense, output, gnd and other pins. The IC controller has comparator 409, Sawtooth Generator 410, Opamp 408, reference 407, driver 411 and signal process 406 integrated inside the controller.

Referring to FIG. 6, the flyback converter circuit includes a flyback topology converter that receives a DC (direct current) voltage from bridge rectifier 413. Transformer T1, Mosfet M1, diode D8 and capacitor C6 constitute a flyback topology that converts a rectified AC or DC voltage to a constant output DC voltage at predetermined value. Resistors R2, R3 and capacitor C3 compose an input sense circuit. Capacitor C5 is a filter for feedback signal sent to Vsense pin of IC controller. Auxiliary winding T1B, diode D7, zenor diode D6 and capacitor C4 constitute a biasing circuit for IC controller.

Capacitor C2, diode D5 and resistor R4 become a snubber circuit to clamp voltage across drain and source of Mosfet M1.

More specifically, the positive node of input voltage 401 is in communication with a first node of fuse F1. A second node of fuse F1 is in communication with anode of diode D1 and cathode of diode D3. The negative node of input voltage 401 is in communication with a first node of inductor L1 and a first node of resistor R1. A second node of inductor L1 is in communication with a second node of resistor R1, anode of diode D2 and cathode of diode D4. Cathodes of diodes D1-D2 are in communication with first nodes of capacitor C1, resistor R2, capacitor C2, resistor R4 and transformer primary winding T1A. Anodes of diodes D3-D4 are in communication with ground and a second node of capacitor C1. A second node of resistor R2 is in communication with a first node of resistor R3. A second node of resistor R3 is in communication with a first node of capacitor C3 and pin Vin of controller 412. A second node of capacitor C3 is in communication with ground. A second node of capacitor C2 is in communication with cathode of diode D5 and a second node of resistor R4. Cathode of diode D5 is in communication with a second node of transformer primary winding and drain of Mosfet M1. Gate of Mosfet M1 is in communication with a second node of resistor R5 and a first node of resistor R6. A first node of resistor R5 is in communication with output pin of controller 412. Source of Mosfet M1 is in communication with a second node of resistor R5, a first node of resistor R9 and Isense pin of controller 412. A second node of resistor R9 is in communication with ground and a first node of transformer auxiliary winding T1B. A second node of transformer auxiliary winding is in communication with cathode of diode D7 and a first node of resistor R7. Cathode of diode D7 is in communication with first nodes of diode D6, capacitor C4 and pin Vcc of controller 412. Second nodes of diode D6 and capacitor C4 are in communication with ground. A second node of resistor R7 is in communication with first nodes of resistor R8, capacitor C5 and vsense pin of controller 412. Second nodes of resistor R8, capacitor C5 are in communication with ground. Ground pin of controller 412 is in communication with ground. A second node of transformer secondary winding is in communication with anode of diode D8. Cathode of diode D8 is in communication with a capacitor C6 and the positive node of output device 403. A first node of transformer secondary winding is in communication with a second node of capacitor C6 and the negative node of output device 403.

Referring to FIG. 6, the output voltage can be determined as the following:

The voltage Vc1 is a DC voltage rectified from AC input voltage. Vc1 value is the peak voltage of AC input voltage. N2 is turns of transformer secondary winding. N1 is turns of transformer primary winding.

During the on time of Mosfet M1, voltage across primary winding of transformer T1 is (Vc1−Io*N2/N1*R9), the * end is positive with respect with the other end of primary winding of transformer. So do the secondary and auxiliary windings of transformer T1. D8 and D7 are reverse biased.

During the off time of Mosfet M1, the polarity of primary winding of transformer T1 is changed. The * end is negative with respect with the other end of primary winding of transformer. D8 is forward biased and D7 is forward biased. So the voltage coupled on primary winding of transformer is Vo*(N1/N2). N1/N2 is turns ratio of primary and secondary windings.

During steady state, the average voltage across primary winding of transformer will be 0. $D*(Vc1-Io*N2/N1*R9)+(-D'*Vo*(N1/N2))=0$, So $Vo=D*(Vc1-Io*N2/N1*R9)*(N2/N1)/D'$. (eq. 3)

Vo=Io*Rload, So $Io=(D/D')*Vc1*(N2/N1)/(Rload+(D/D')R9*(N2/N1)*(N2/N1))$ (eq. 4)

Or $Vo=Vc1/((D'/D)*(N1/N2)+(N2/N1)*R9/Rload)$ (eq. 5)

In operation, D can be changed to set to and Vo at constant.

Voltage feedback signal is $FBv=Vo*(Naux)/Nsec*R8/(R7+R8)$. (eq. 6)

Current feedback signal is $FBi=Io*(Nsec)/Npri*R9$ (eq. 7)

Then the output of signal process 406 will be multiplication product of voltage feedback signal and current feedback signal, that is FBv*FBi=Vo*Io*(Naux/Npri)*R8*R9/(R7+R8).

Power feedback signal is $FBp=FBv*FBi=Vo*Io*(Naux/Npri)*R8*R9/(R7+R8)$ (eq. 8)

Naux, Npri, R7, R8 and R9 are fixed value. So FBp can be rewritten as:

$FBp=Vo*Io*k$ (eq. 9)

Where k=(Naux/Npri)*R8*R9/(R7+R8),

Output power $Po=Vo*Io$, so $FBp=Po*k$ (eq. 10)

FB signal is sent to Opamp inside the controller U1 to compare with reference inside the controller. The error signal with gain is sent to comparator inside the controller and compared with sawtooth waveform. Then the output of comparator is sent to driver inside the chip to create a pulse. The output of driver inside the controller is sent to gate of main switch M1 to keep output of converter across C6 has constant power. Thus keep output power constant and keep lamp brightness constant.

FIG. 7 illustrates one implementation of switching power supply 400 in which voltage feedback is opto-coupler feedback. Other block is the same as FIG. 6. Only voltage feedback 404 is different from FIG. 6.

More specifically, a positive node of output is in communication with positive voltage node of opamp U2 and first nodes of resistor R15, R7. Negative voltage node of opamp U2 is in communication with secondary ground. A second node of resistor R15 is in communication with anode of diode in opto-coupler O1. A second node of resistor R7 is in communication with a first node of resistor R10, second nodes of resistor R16, capacitor C5, a first node of resistor R8 and reference pin of programmable shunt regulator U3. Cathode of diode in opto-coupler O1 is in communication with first nodes of capacitor C7, capacitor C5 and cathode pin of programmable shunt regulator U3. A second node of capacitor C7 is in communication with a first node resistor R16. Anode pin of programmable shunt regulator U3 is in communication with secondary ground and a first node of resistor R11. A second node of resistor R8 is in communication with a second node of resistor R11 and a first node of resistor R12. A second node of resistor R12 is in communication with a second node of capacitor C8 and inverting pin of Opamp U2. Non inverting pin of Opamp U2 is in communication with a first node of resistor R13. A second node of resistor R13 is in communication with a first node of resistor R14 and negative side of output device. A second node of resistor R14 is in communication with ground.

A number of implementations have been described. Nevertheless, it will be understood that various modifications may be made without departing from the spirit and scope of the invention. For example, the converter topologies described above—e.g. converter 402 can be implemented with a boost topology converter. In addition, the converter topologies discussed above can be used with power supplies to supply power to lamps—for example, LED, incandescent, halogen lamp or OLED lamp. Accordingly, other implementations are within the scope of the following claims.

What is claimed is:

1. A power supply comprising:
   a filter operable to prevent high frequency current from entering input voltage source;
   a protection operable to protect the power supply at over current condition;
   a bridge rectifier operable to rectify an alternating current (AC) voltage and generate a DC input voltage;
   a converter to convert an input voltage to an output voltage for an output device with constant power;
   a controller operable to adjust on time of main switch in the converter to keep output at constant power, the controller comprising:
   (i) a signal process circuit operable to generate a power feedback signal as multiplication product of voltage feedback signal and current feedback signal;
   (ii) a reference operable to set a voltage signal proportional to a predetermined power level;
   (iii) an opamp operable to compare power feedback signal with a reference signal and generate a power error signal with gain;
   (iv) a saw tooth generator operable to generate a saw tooth signal;
   (v) a comparator operable to compare power error signal with saw tooth signal and generate a pulse; and
   (vi) a driver operable to control on time of the main switch of the converter to keep output at constant power;
   a voltage feedback circuit operable to sample output voltage and send the voltage feedback signal proportional to output voltage back to the controller; and
   a current feedback circuit operable to sample output current and send the current feedback signal proportional to output current back to the controller.

2. The power supply of claim 1, wherein the output is connected to the output device, in one implementation, the output device is a lamp.

3. The power supply of claim 1, wherein:
   the converter outputs a constant power to a lamp to keep the lamp at constant brightness.

4. The power supply of claim 1, wherein:
   the converter is a flyback converter.

5. The power supply of claim 1, wherein:
   the controller is operable to adjust on time of main switch in the converter.

* * * * *